US006561687B1

(12) United States Patent
Satsukawa et al.

(10) Patent No.: US 6,561,687 B1
(45) Date of Patent: May 13, 2003

(54) VEHICLE LAMP

(75) Inventors: Hideaki Satsukawa, Shizuoka (JP); Yasuyuki Amano, Shizuoka (JP); Hiroshi Kawashima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/471,009

(22) Filed: Dec. 23, 1999

(30) Foreign Application Priority Data

Dec. 25, 1998 (JP) ........................................ 10-368820

(51) Int. Cl.[7] ................................................ B60Q 1/30

(52) U.S. Cl. ...................... 362/518; 362/517; 362/518; 362/296; 362/346; 362/347

(58) Field of Search ............................... 362/516–518, 362/296, 297, 346, 347

(56) References Cited

U.S. PATENT DOCUMENTS 4,277,821 A * 7/1981 Sassmannshausen ........ 362/346
4,916,585 A 4/1990 Nino
4,959,757 A * 9/1990 Nakata ........................ 362/61
5,192,124 A 3/1993 Kawashima et al.
5,416,671 A 5/1995 Uchida
5,432,685 A 7/1995 Taksukawa et al.
5,450,294 A * 9/1995 Hogrefe ....................... 362/61
5,469,339 A 11/1995 Iiyama et al.
5,532,909 A 7/1996 Ban et al.
5,620,246 A 4/1997 Uehan

* cited by examiner

*Primary Examiner*—Sandra O'Shea
*Assistant Examiner*—Anabel Ton
(74) *Attorney, Agent, or Firm*—Sughrue Mion, PLLC

(57) ABSTRACT

The shape of a horizontal cross section Sho including a reference axis Ax on a reflective surface 14*a* is set to a curved shape for focusing and reflecting light from a light source 12*a* closer to the reference axis Ax within the horizontal cross section Sho. The shape of a vertical cross section including the axis in the direction of emitting reflected light at each of the points on the horizontal cross section including the reference axis Ax on the reflective surface 14*a* is set to a curved shape for reflecting the light from the light source in substantially parallel to the axis in the direction of emitting the reflected light in a central reflective area near the lateral reference axis Ax. The shapes of peripheral reflective areas 14*a*2 on both sides of the central reflective area are respectively set to curved shapes for focusing and reflecting the light from the light source 12*a* closer to the axis in the direction of emitting the reflected light. It is thus possible to obtain a light distribution pattern with less nonuniformity in light and a substantially laterally long rectangular shape.

4 Claims, 12 Drawing Sheets c
Svo
14a(14a2)
Rx d
Svo
14a(14a2)
Rx a
Svo
14a(14a1)
Rx
(Ax)

b
Svo
14a(14a2)
Rx

VEHICLE LAMP

BACKGROUND OF THE INVENTION

1. Field of the Invention

This invention relates to vehicle lamps and more particularly to a reflective surface of a reflector of such a vehicle lamp.

2. Description of the Related Art

Vehicle lamps are generally fitted with light sources, reflectors and lenses. As shown in FIG. 12, however, the reflective surface 2*a* of a reflector 2 is formed with a paraboloid of revolution with a longitudinal axis passing through a light source 4 as a reference axis Ax in a conventional vehicle lamp so that a desired light distribution pattern may be formed by causing light from the light source 4 to be reflected from the reflective surface 2*a* in substantially parallel to the reference axis Ax and then causing the light to be deflected and diffused by lens steps 6*s* formed on a lens 6.

Nevertheless, there exist problems arising from making it not so easy to obtain a light distribution pattern with less nonuniformity in light since the formation of the light distribution pattern totally depends on the deflecting and diffusing control functions of the lens 6 and also rendering the lamp lacking a feeling of transparency to be less externally attractive as the curvature of each lens step 6*s* becomes relatively larger.

SUMMARY OF THE INVENTION

It is an object of the present invention made in the aforementioned situation which provides a vehicle lamp that makes available a light distribution pattern with less nonuniformity in light and looks externally attractive with a feeling of excellent transparency.

The shape of the reflective surface of a reflector according to the present invention has been so contrived as to accomplish the object above.

In this invention, a vehicle lamp according to the present invention comprises a light source and a reflector having a reflective surface, being defined as a first cross section and a second cross section, with a longitudinal axis passing through the light source as a reference axis, wherein said first cross section which is defined as at least one of the horizontal and vertical cross sections including the reference axis on the reflective surface is set to such a curved shape that a reflected light from the light source reflected on the reflective surface is focused closer to the reference axis in the first cross section; and said second cross section including an axis in an emitting direction of the reflected light at each of points on said first cross section, which is further defined as a cross section to be orthogonal to said first cross section, wherein said second cross section is set to such a curved shape that a reflected light from the light source is in substantially parallel to the axis in the emitting direction of the reflected light on said first cross section in a central reflective area near the reference axis, and is set to such a curved shape that a reflected light from the light source is focused closer to the axis in the emitting direction of the reflected light on said first cross section in peripheral reflective areas on both sides of the central reflective area The curved shape forming the first cross section including the reference axis on the reflective surface is not limited to a specific one but may be set to any shape as long as it is usable for focusing and reflecting the light from the light source closer to the reference axis within the first cross section; may be, for example, an ellipse with the reference axis as the major axis or what is similar thereto.

With respect to the second cross section including the axis in the direction of emitting reflected light at each of the points on the first cross section on the reflective surface and crossing the first cross section at right angles, as its curved shape forming the second cross section in the central reflective area is intended to reflect the light from the light source in substantially parallel to the axis in the direction of emitting the reflected light it is substantially parabolic to be concrete. However, the shape is not limited to a specific one but may be set to any shape as long as each of the curved shapes forming the second cross section in the peripheral reflective area is usable for focusing and reflecting the light from the light source closer to the axis in the direction of emitting the reflected light; may be, for example, an ellipse with the reference axis as the major axis or what is similar thereto.

By the ‘peripheral reflective area’ is meant that the areas located on the respective sides in the first cross sectional direction against the central reflective area. However, the ‘peripheral reflective area’ located on both sides in the second cross sectional direction may be included against the central reflective area.

As shown in the arrangement above, according to the present invention, the shape of the first cross section including the reference axis on the reflective surface of the reflector is set to the curved shape for focusing and reflecting light from the light source closer to the reference axis within the first cross section, and a light distribution pattern diffusing in the first cross sectional direction (after being concentrated once) can be obtained from the light reflected from the reflector.

Further, according to the present invention, the shape of the second cross section including the axis in the direction of emitting reflected light at each of the points on the first cross section is set to the curved shape for reflecting the light from the light source in substantially parallel to the axis in the direction of emitting the reflected light in the central reflective area, and the shapes of the peripheral reflective areas on both sides of the central reflective area are respectively set to curved shapes for focusing and reflecting the light from the light source closer to the axis in the direction of emitting the reflected light. Consequently, the following effect will be obtainable.

More specifically, the light source is sized to some degree, whereby the reflected light in the central reflective area closer to the light source is irradiated forward and becomes an image greater than the reflected light in both the lateral peripheral reflective areas.

According to this embodiment of the invention, the second vertical cross sectional shape of the central reflective area is set to the curved shape so that reflected light in substantially parallel to the axis in the direction of emitting the reflected light may be obtained. Further, each of the vertical cross sectional shapes of both the lateral peripheral reflective areas is set to the curved shape so that reflected light focusing closer to the axis in the direction of emitting the reflected light may be obtained. In consequence, the light distribution pattern horizontally diffusing can be widened vertically up to a substantially fixed width over its whole width and this makes it possible to readily provide a substantially rectangular light distribution pattern for the whole reflective surface, the pattern greatly expanding in the first cross sectional direction rather than the second cross sectional direction.

With the light source and the reflector, the light distribution pattern with less nonuniformity in light can readily be obtained and the light distribution pattern or any similar one required for the lamp can also be obtained despite the fact that the lens is a see-through lens or any similar one.

Since the reflective surface is formed with a smooth curved surface, a feeling of excellent transparency is made available for the lamp from the curved surface together with the see-through lens or any similar one.

Thus, according to the present invention, a light distribution pattern with less nonuniformity in light can readily be obtained and a vehicle lamp having a feeling of excellent transparency as well as a good external appearance becomes also obtainable.

Moreover, according to the present invention, as the light from the light source excluding part of the reflective area is caused by the reflective surface to be focused and reflected closer to the axis in the direction of emitting the reflected fight, the utilizing solid angle can be increased in comparison with the conventional case where the reflective surface is formed into a paraboloid of revolution. Thus, the lamp efficiency is made improvable thereby.

The 'first cross section' above may be one of the horizontal and vertical cross sections including the reference axis and may be set in accordance with the shape of the lamp and the desired light distribution pattern. As one of embodiments in this invention, a substantially rectangular light distribution pattern greatly expanding in the horizontal direction can readily be obtained when the shape is set to the horizontal cross section, whereby the desired light distribution pattern of the lamp can also readily be formed.

Further, in the arrangement above, the curved shape of the first cross section is set so that the focusing degree of the reflected light closer to the reference axis may be increased as the distance from the reference axis increases, whereby it is possible to obtain a luminous intensity distribution is obtainable such that the brightness gradually decreases from the central portion to the peripheral portion within the first cross section.

Still further, in the arrangement above, the curved shape of each second cross section in the peripheral reflective area is set so that the focusing degree of the reflected light closer to the reference axis in the direction of emitting the reflected light may be increased as the distance between the reference axis and the second cross section increases whereby it is possible to obtain a luminous intensity distribution is obtainable such that the brightness gradually decreases from the central portion to the peripheral portion within the second cross section.

DESCRIPTION OF THE PREFERRED EMBODIMENTS

A mode for carrying out the invention will now be described with reference to the drawings.

Figure 1:
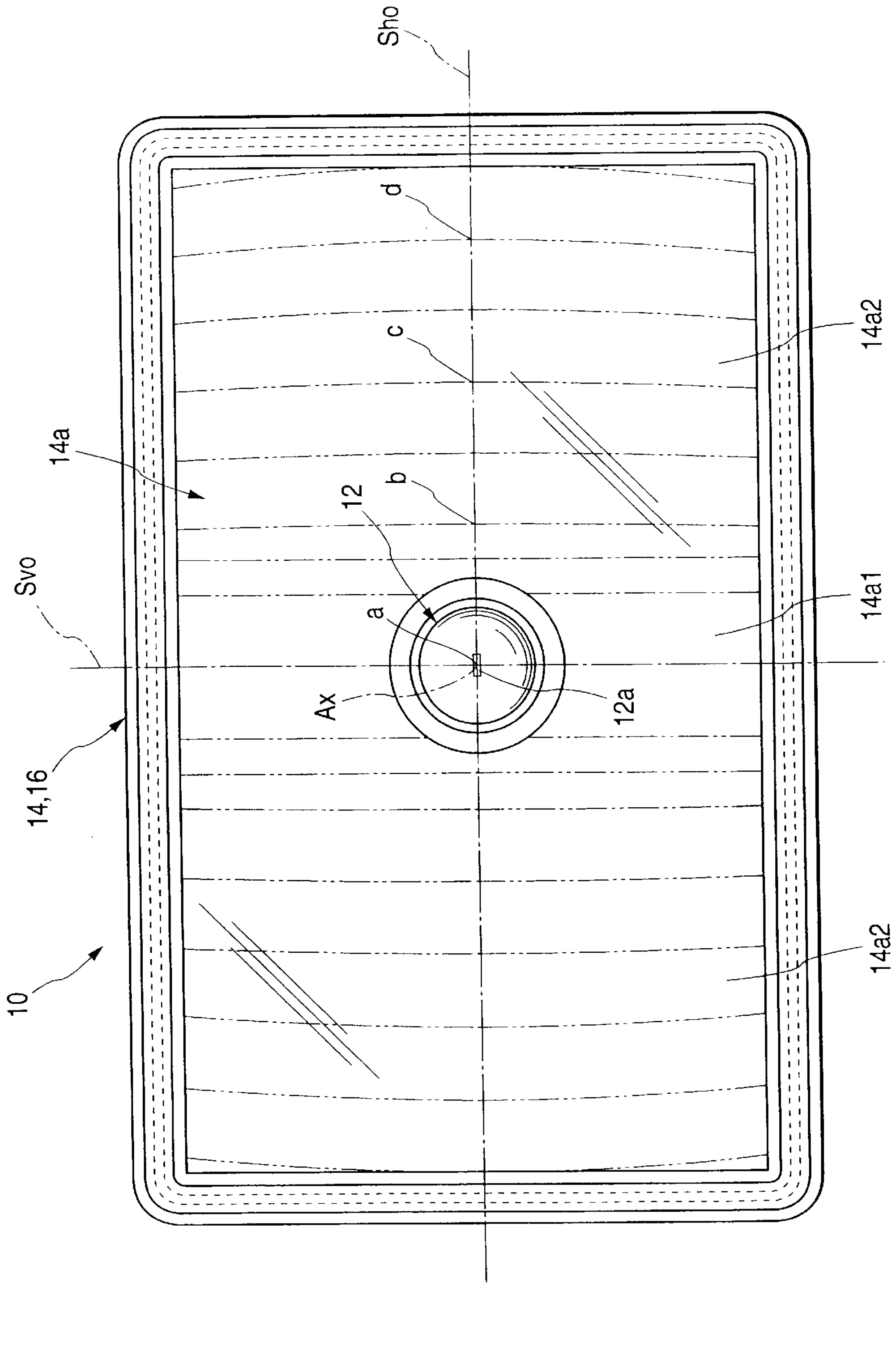
FIG. 1 is an elevational view of a vehicle lamp embodying the present invention.
Figure 2:
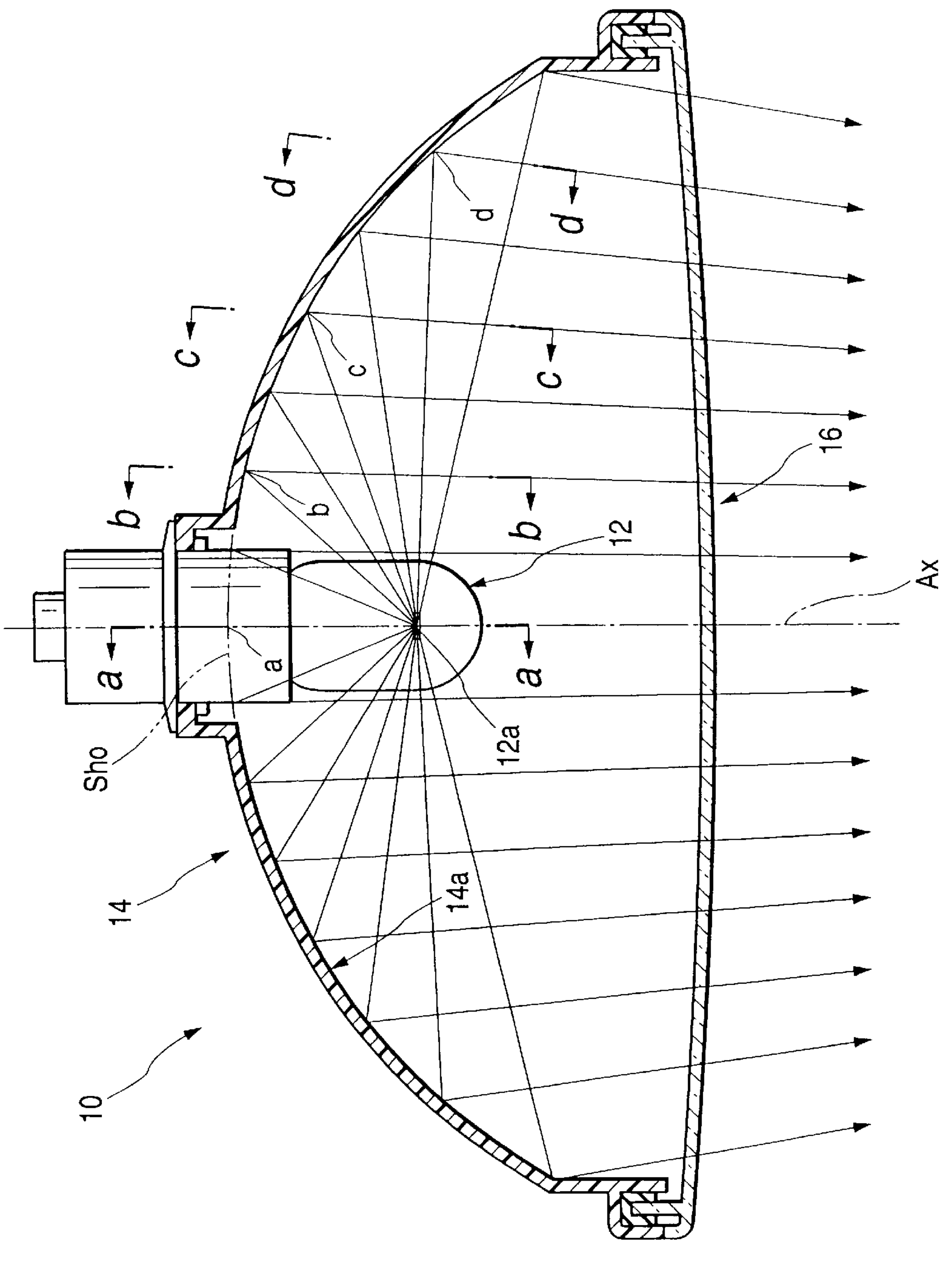
FIG. 2 is a horizontal sectional view of the vehicle lamp embodying the present invention.
Figure 3:
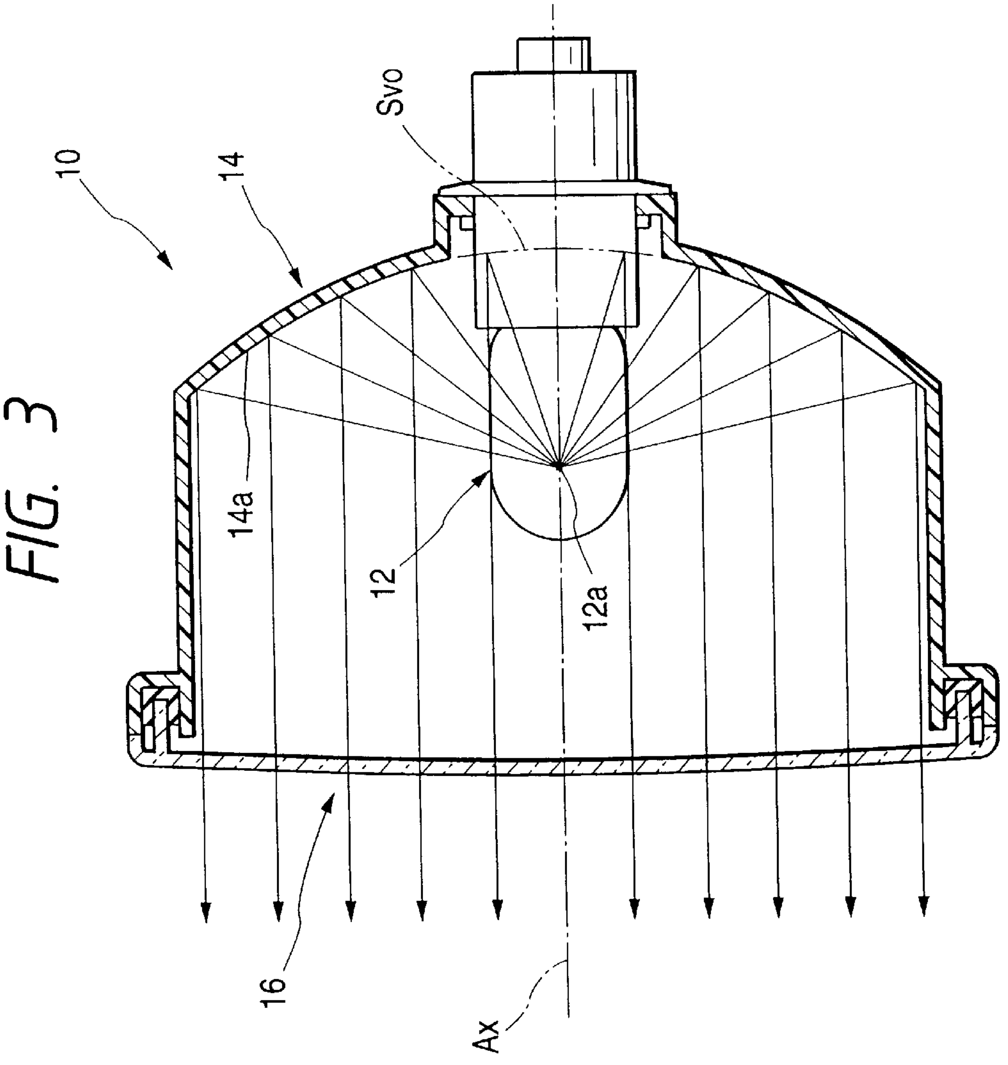
FIG. 3 is a sectional side elevation of the vehicle lamp embodying the present invention.

FIG. 1 is an elevational view of a vehicle lamp 10 embodying the present invention; and FIGS. 2 and 3, a horizontal sectional view and a sectional side elevation thereof, respectively.

As shown in these drawings above, the vehicle lamp 10 is a tail lamp provided in the rear end portion of a vehicle body, the tail lamp comprising a reflector 14 fitted with a light source bulb 12 and a lens 16 provided in front of the reflector 14 (which lens is placed on the front side of the lamp and also placed in the rear of the vehicle body, and the same will apply hereinafter).

The light source bulb 12 has a filament as a light source 12*a* of a so-called C-6 type whose center is positioned on the reference axis Ax extending in the longitudinal direction, so that the filament extends horizontally in a direction perpendicular to the reference axis Ax.

The reflector 14 has a reflective surface 14*a* for reflecting light from the light source 12*a* forward and the reflective surface 14*a* is externally in the form of a laterally long rectangle as seen from the front side of the lamp.

The lens 16 above is a see-through lens and the reflector 14 is provided with a light distribution control function as the tail lamp. In order to materialize the function, the reflective surface 14*a* of the reflector 14 has a cross sectional shape as will be described below.

Figure 4:
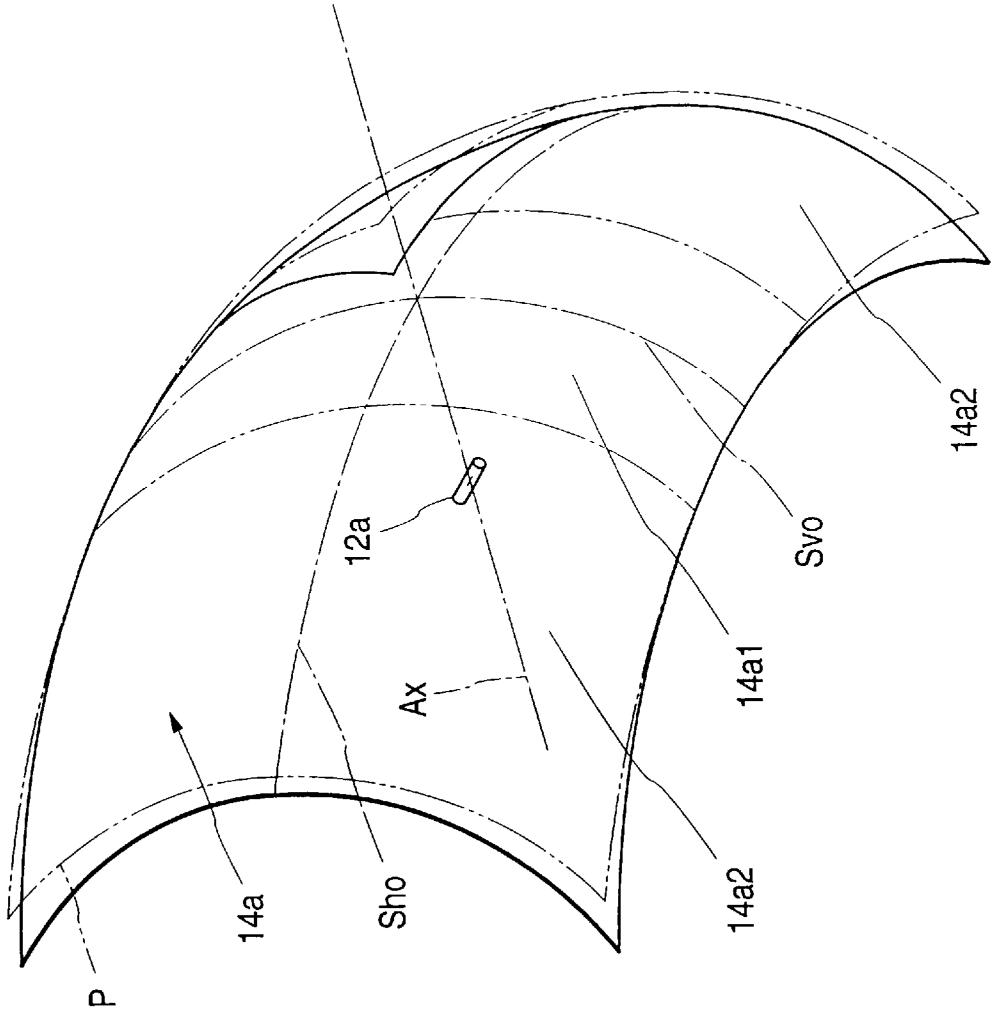
FIG. 4 is a perspective view showing a curved surface forming the reflective surface of a reflector of the vehicle lamp.

FIG. 4 is a perspective view showing a curved surface forming the reflective surface 14*a*.

The curved surface shown by a solid line in FIG. 4 is a curved surface forming the reflective surface 14*a* and a curved surface P shown by a chain double-dashed line is a paraboloid of revolution with the reference axis Ax as a center axis and with the center position of the light source 12*a* as a focus.

Figure 5:
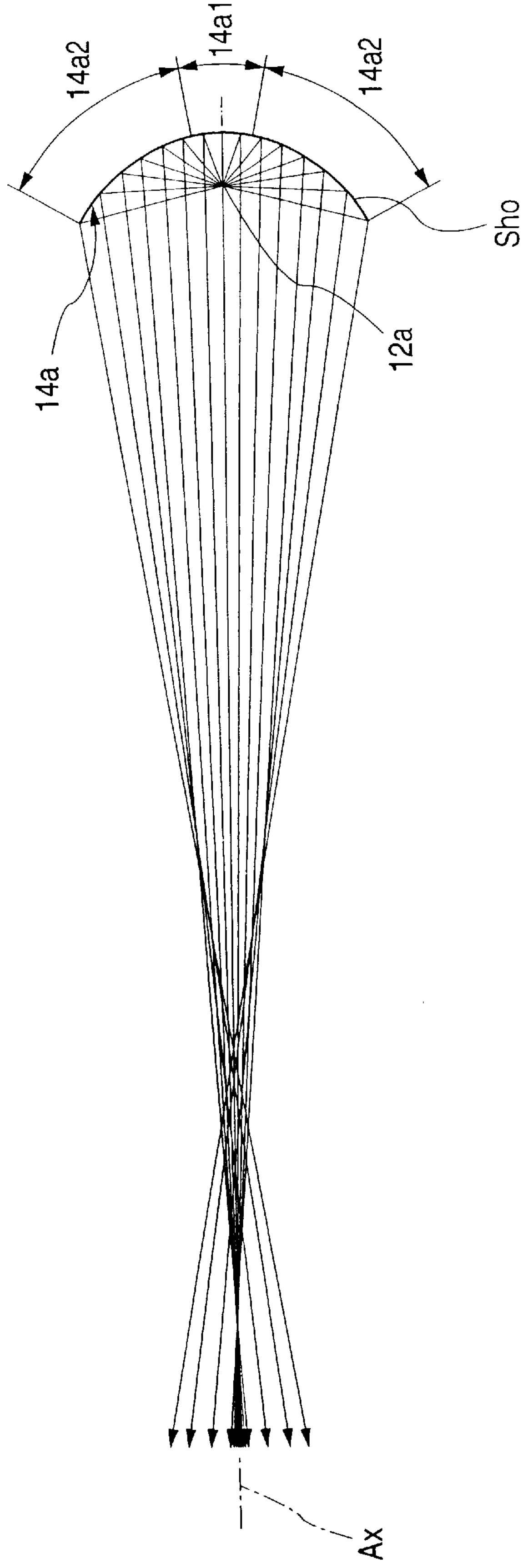
FIG. 5 is a horizontal sectional view including a reference axis on the reflective surface.

The shape of a horizontal cross section Sho (the first cross section) including the reference axis Ax on the reflective surface 14*a* in FIG. 4 is set to a curved shape for focusing and reflecting the light from the light source 12*a* closer to the reference axis Ax within the horizontal cross section Sho as shown in FIG. 2. This curved shape is what approximates to an ellipse with the reference axis Ax as the major axis and its curvature is set so that the focusing degree closer to the reference axis Ax of the reflected light may grow greater as the distance from the reference axis Ax increases. Consequently, the light reflected from the reflective surface 14*a* in the horizontal cross section Sho is horizontally concentrated once before being diffused as shown in FIG. 5 whereby to emit the light forward as horizontally diffused light.

A vertical cross section Svo (the first cross section) including the reference axis Ax on the reflective surface 14*a* of FIG. 4 is set to a curved shape for reflecting the light from the light source 12*a* in substantially parallel to the reference axis Ax as shown in FIG. 3. This curved shape is a parabolic shape with the reference axis Ax as the center axis and with the center position of the light source 12*a* as the focus.

Figures 6A, 6B, 6C, 6D:
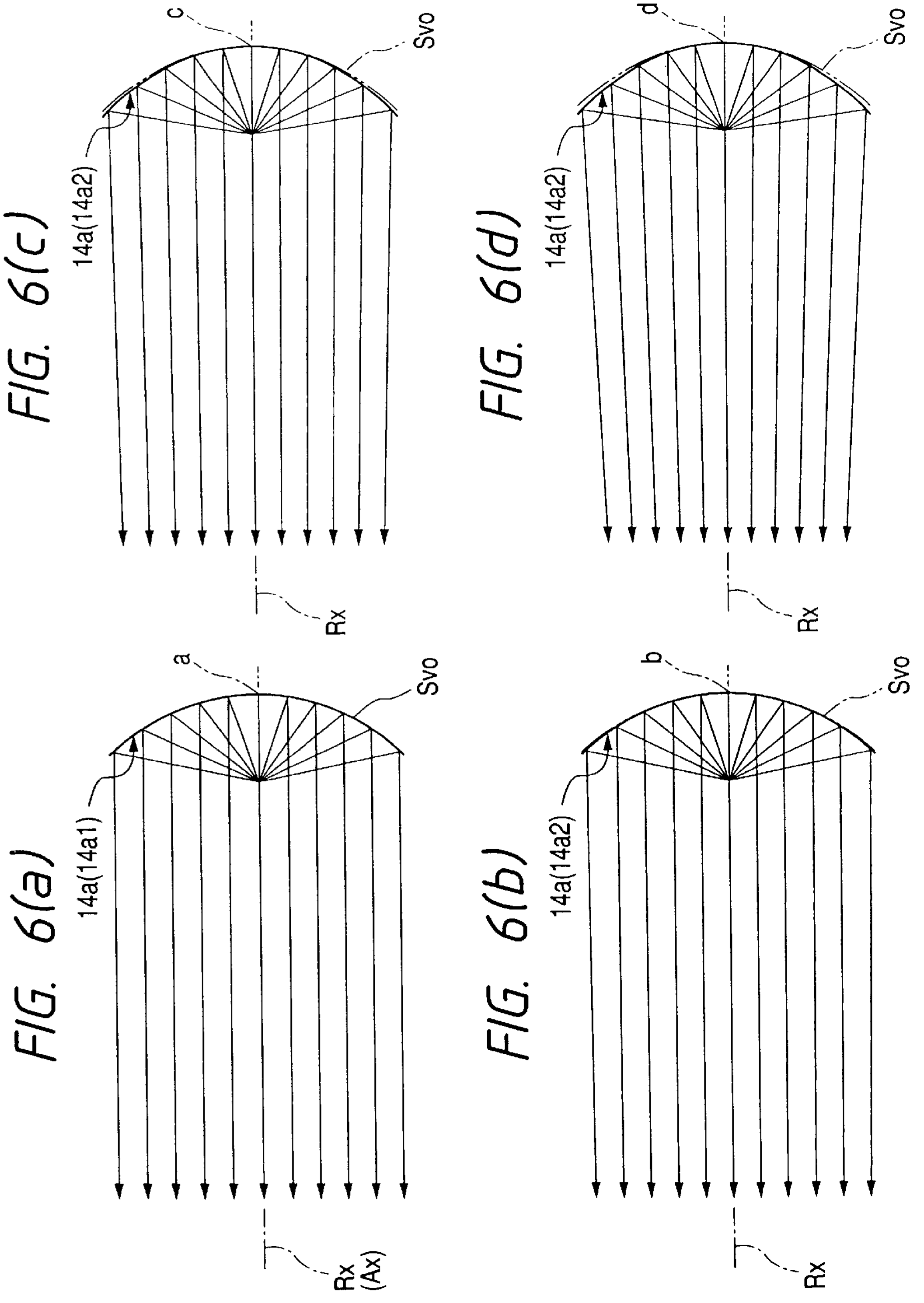
FIGS. 6A to 6D are vertical sectional views illustrating the reflective surfaces including axes in directions in which reflected light is emitted at each of the points including the reference axis, respectively.

FIG. 6 shows sectional views illustrating vertical cross sections including axes Rx in directions in which reflected light is emitted at points a, b, c, d (see FIGS. 1 and 2) on the horizontal cross sections Sho of the reflective surfaces 14*a*, respectively.

As shown in FIG. 6(*a*), the point a exists on the reference axis Ax and though its vertical cross sectional shape is parabolic as mentioned above, the vertical cross sectional shape at any other point within the central reflective area 14*a*1 (see FIG. 1) located laterally closer to the reference axis Ax is also set parabolic.

The vertical cross sectional shapes in the peripheral reflective areas 14*a*2 located on both lateral sides of the central reflective area 14*a*1 are set to curved shapes that cause the light from the light source 12*a* to be focused and reflected closer to the axis Rx in the direction of emitting the reflected light within the vertical cross section. This curved shape is what approximates to an ellipse with the axis Rx in the direction of emitting the reflected light as the major axis and its curvature is set so that the focusing degree closer to the axis Rx of the reflected light in the direction of emitting the reflected light may grow greater as the distance between the vertical cross section and the reference axis Ax increases. Thus, as shown in FIGS. 6(*b*)–(*d*), the light reflected from the reflective surface 14*a* in each vertical cross section is emitted forward as vertically diffused light that diffuses after being concentrated once in the vertical direction, so that the vertically diffused angle becomes larger as the distance between the reference axis Ax and the vertical cross section increases.

Operation/working effect of this embodiment of the invention will now be described.

Figure 7:
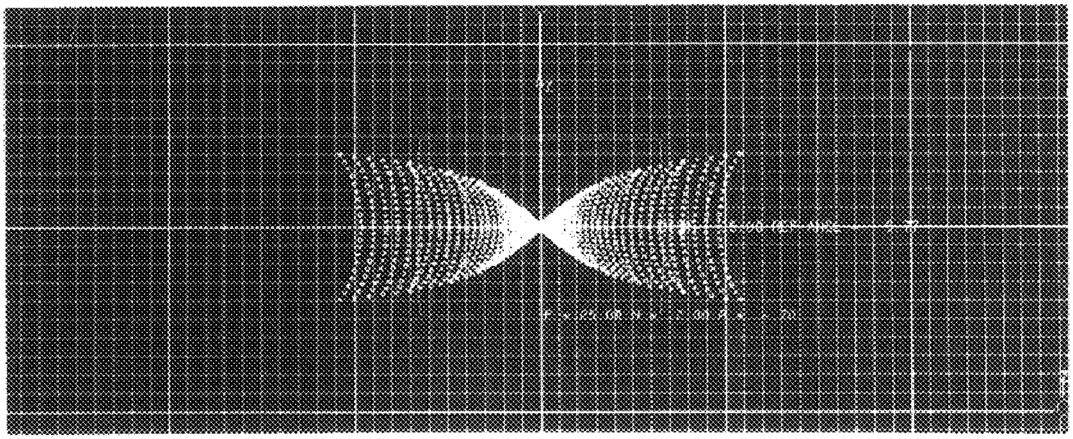
FIG. 7 is a light distribution pattern formed by the reflective surface on the assumption that a point source exists at the center position of the light source of the vehicle lamp.
Figure 8:
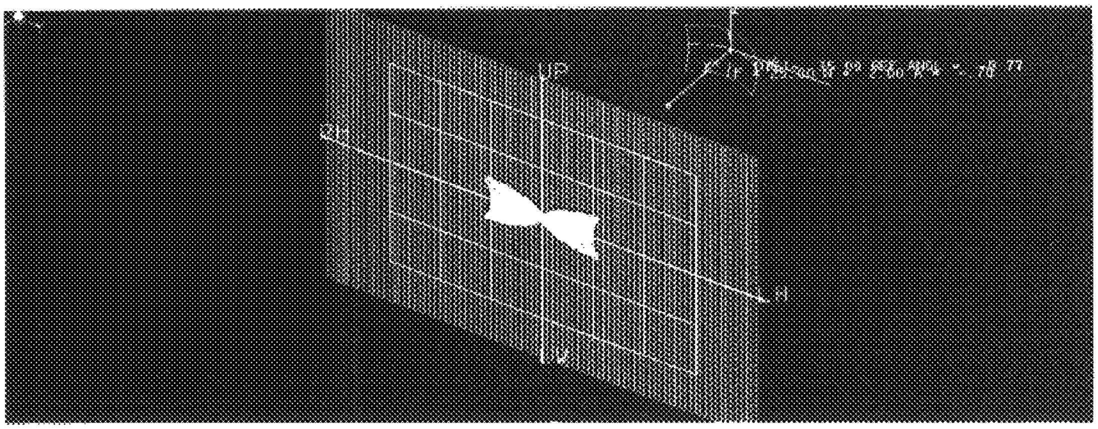
FIG. 8 is a perspective view of the light distribution pattern thereof.

FIG. 7 shows the light distribution pattern formed by the reflective surface 14*a* on the assumption that a point source exists at the center position of the light source 12*a*; and FIG. 8, a perspective view thereof.

This light distribution pattern is a light distribution pattern formed on a screen that is positioned √3 m ahead of the lamp and substantially has an external shape of a bow tie, a region near its H-V (a forward position of the reference axis Ax) being extremely bright in a substantially X form. This is because the vertical cross sectional shape of the central reflective area 14*a*1 is set parabolic and because the light from the aforementioned point source is reflected in substantially parallel to the reference axis Ax.

Figure 9:
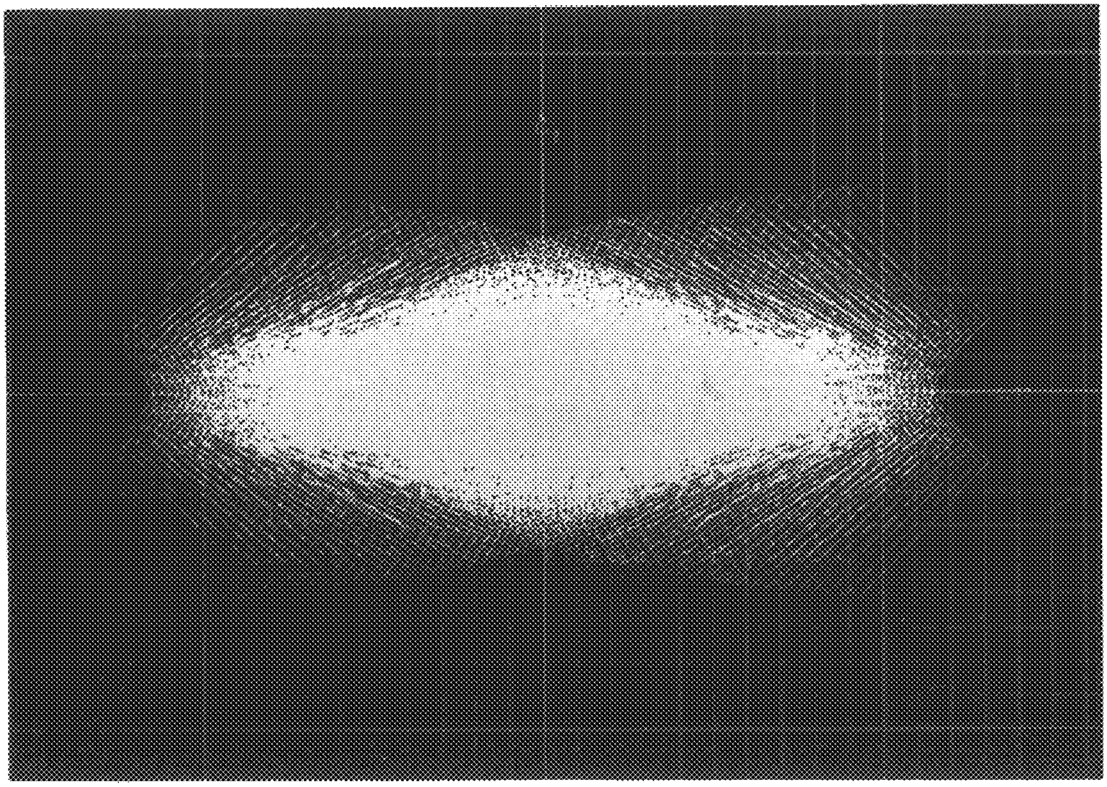
FIG. 9 is a diagram showing an actual light distribution pattern formed on the reflective surface.

Actually, the light source 12*a* is in a laterally long cylindrical form and sized to some degree, whereby the reflected light in the central reflective area 14*a*1 closer to the light source 12*a* is irradiated forward and becomes an image greater than the reflected light in both the lateral peripheral reflective areas 14*a*2. Therefore, as shown in FIG. 9, the aforementioned light distribution pattern has an external shape of a substantially laterally long rectangle, that is, it is a light distribution pattern whose bright portion expands in a wide range around the H-V.

As set forth above, according to this embodiment of the invention, the shape of the horizontal cross section Sho including the reference axis Ax on the reflective surface 14*a* is set to the curved shape for focusing and reflecting the light from the light source 12*a* closer to the reference axis Ax within the horizontal cross section Sho. Further, the vertical cross sectional shape of the central reflective area 14*a*1 near the reference axis Ax on the reflective surface 14*a* is set to the curved shape so that reflected light in substantially parallel to the axis Rx in the direction of emitting the reflected light may be obtained. Further, each of the vertical cross sectional shapes of both the lateral peripheral reflective areas is set to the curved shape so that reflected light focusing closer to the axis Rx in the direction of emitting the reflected light may be obtained. In consequence, the light distribution pattern horizontally diffusing can be widened vertically up to a substantially fixed width over its whole width and this makes it possible to readily provide a substantially rectangular light distribution pattern for the whole reflective surface 14*a*, the pattern greatly expanding in the horizontal direction rather than the vertical direction.

With the light source 12*a* and the reflector 14, the light distribution pattern with less nonuniformity in light can readily be obtained and the light distribution pattern required for the tail lamp can also be obtained despite the fact that the lens 16 is a see-through lens.

Since the reflective surface 14*a* is formed with a smooth curved surface, a feeling of excellent transparency is made available for the lamp from the curved surface together with the see-through lens 16.

Thus, according to this embodiment of the invention, a light distribution pattern with less nonuniformity in light can readily be obtained and a vehicle lamp having a feeling of excellent transparency as well as a good external appearance becomes also obtainable.

Moreover, according to this embodiment of the invention, as the light from the light source 12*a* excluding part of the reflective area is caused by the reflective surface 14*a* to be focused and reflected closer to the axis Rx in the direction of emitting the reflected light, the utilizing solid angle can be increased in comparison with the conventional case where the reflective surface is formed into a paraboloid of revolution as shown in FIG. 4. Thus, the lamp efficiency is made improvable thereby.

Further, according to this embodiment of the invention, the curved shape forming the horizontal cross section Sho is set so that the focusing degree of the reflected light closer to the reference axis Ax may be increased as its distance from the reference axis increases and its curvature is set so that the focusing degree closer to the axis Rx of the reflected light in the direction of emitting the reflected light may grow greater as the distance between the vertical cross section and the reference axis Ax increases. Consequently, a luminous intensity distribution is obtainable such that the brightness gradually decreases from the central portion to the peripheral portion of the light distribution pattern in both the horizontal and vertical directions. Therefore, a more desirable light distribution pattern is available for a tail lamp.

Figure 10:
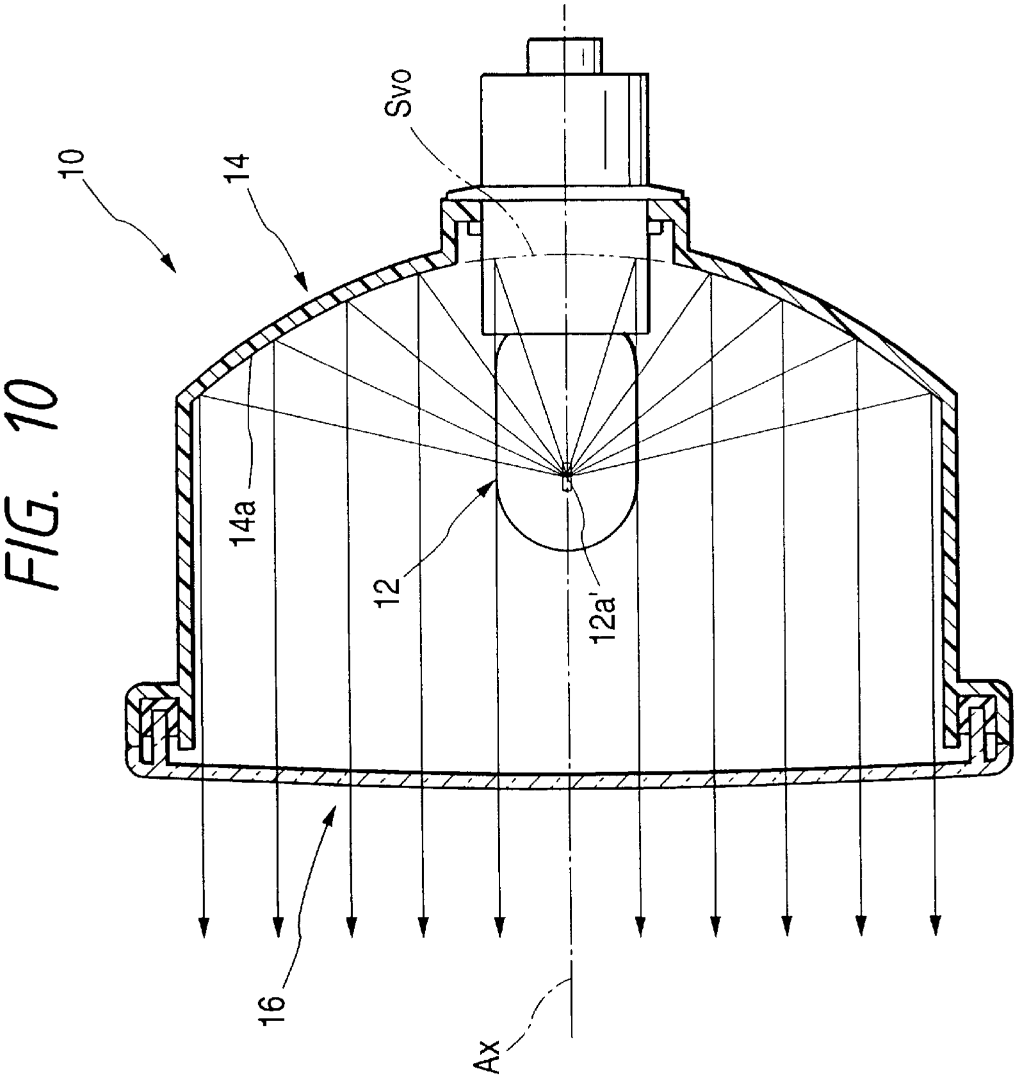
FIG. 10 is a modified embodiment of the invention corresponding to FIG. 3.
Figure 11:
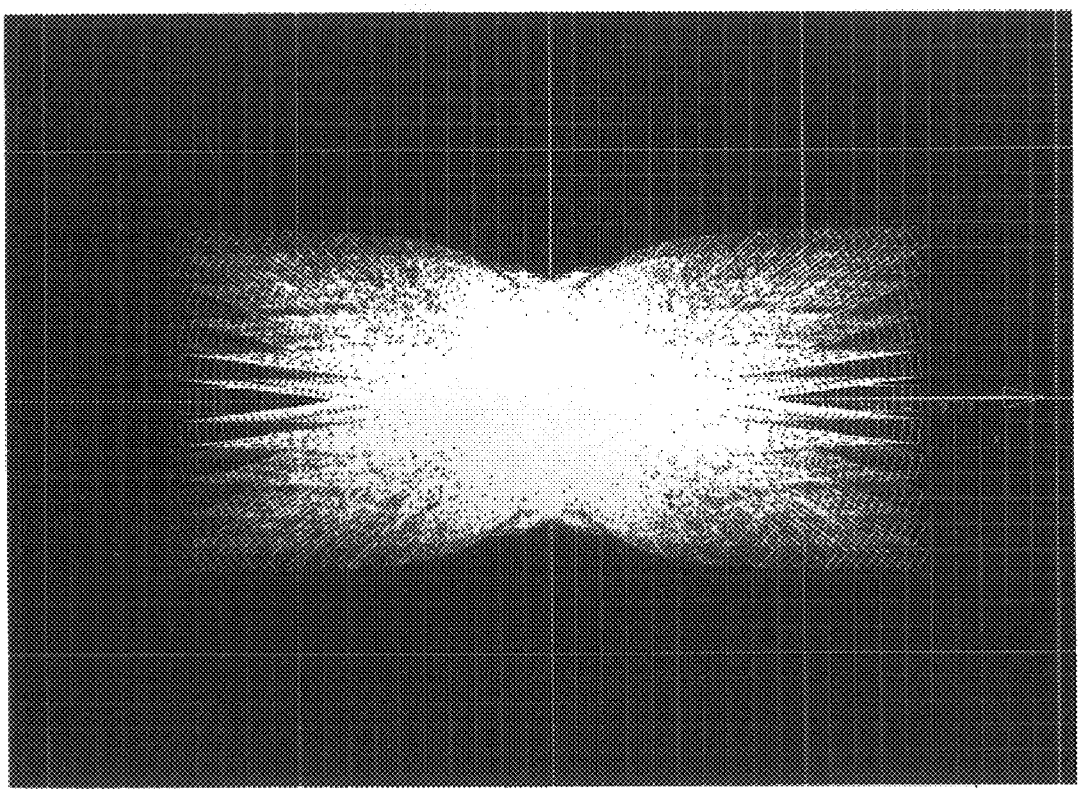
FIG. 11 is a diagram showing the function of the modified embodiment corresponding to FIG. 9.
Figure 12:
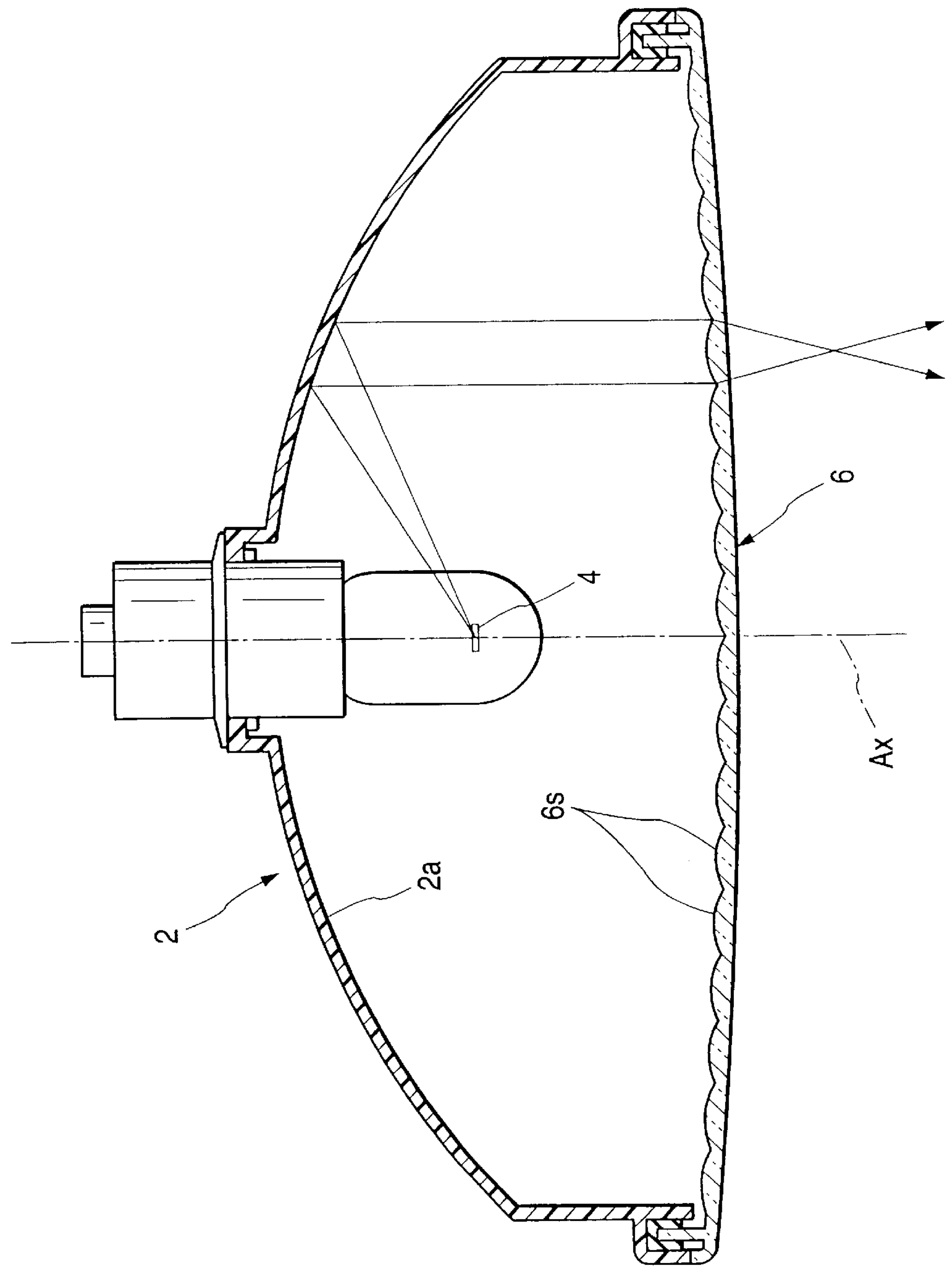
FIG. 12 is a diagram showing a conventional example similar to FIG. 2.

In this embodiment of the invention, the light source with the filament of a C-6 type has been described. As shown in FIG. 10, however, a light source 12*a*' with a filament of a so-called C-8 type extending in the direction of the reference axis Ax on the reference axis Ax may be employed. Even in this case, as shown in FIG. 11, the use of the same reflective surface 14*a* as what has been employed in the preceding embodiment will make available a light distribution pattern with less nonuniformity in light and has an external shape of a substantially laterally long rectangle whose bright portion expands rectangularly and whose brightness gradually decreases from the central portion to the peripheral portion of the light distribution pattern.

Although the see-through lens has been described as the lens 16 according to this embodiment of the invention, any lens having lens steps may be employed. The light reflected from the reflective surface 14*a* is properly diffused by forming such lens steps so as to reduce the nonuniformity in the light distribution pattern further. In this case, since the light distribution pattern required for the tail lamp has already been obtained from the light reflected from the reflective surface 14*a*, it is unnecessary to greatly diffuse the reflected light by means of the lens steps and therefore there is no fear that the external appearance of the lamp is impaired by the formation of such lens steps.

According to this embodiment of the invention, moreover, though the vehicle lamp in the case of a tail lamp has been described, the same effect as stated in the embodiment thereof can be achieved by employing the same reflective surface 14*a* therein for beacon lights such as clearance lamps, high-mount stop lamps, and fog lamps and the like.

The reflective surface may be formed with a curved surface that is turned by 90 degrees (i.e., the curved surface formed by exchanging the horizontal and vertical cross sections Sho and Svo). In this case, as a light distribution pattern expands like a vertically long rectangle, it is preferable that the lens has a proper diffusion angle in the horizontal direction.

What is claimed is:

1. A vehicle lamp comprising a light source and a reflector having a reflective surface with a longitudinal axis passing through the light source as a reference axis, wherein:

a first cross section of the reflector surface is defined as at least one of a horizontal and vertical cross sections that includes the reference axis on the reflective surface, said first cross section having a curved shape for reflecting a light from the light source that is focused closer to the reference axis as the reflected light moves away from the reflective surface; and a plurality of second cross sections of the reflector surface, which are orthogonal to said first cross section, wherein each of said second cross sections include an axis in an emitting direction of the reflected light at points on said first cross section, wherein at least one of said plurality of second cross sections has a curved shape for reflecting a light from the light source substantially parallel to the axis in an emitting direction of the reflected light on said first cross section in a central reflective area near the reference axis, and at least one of said plurality of second cross sections has a curved shape for reflecting a light from the light source to be focused closer to the axis in the emitting direction of the reflected light on said first cross section in peripheral reflective areas on both sides of the central reflective area.

2. A vehicle lamp as claimed in claim 1, wherein the first cross section is a horizontal cross section.

3. A vehicle lamp as claimed in either claim 1 or 2, wherein the curved shape of the first cross section is set so that a focusing degree of each of the reflected light increases as a distance of each of the reflected light increases from the reference axis.

4. A vehicle lamp as claimed in either claim 1 or 2, wherein the curved shape of each second cross section in the peripheral reflective area is set so that a focusing degree of the reflected light closer to the reference axis in the emitting direction of the reflected light is increased as distance between the reference axis and the second cross section increases.

* * * * *